No. 772,403. PATENTED OCT. 18, 1904.
E. CEDERSTROM.
TIRE SETTER.
APPLICATION FILED AUG. 11, 1903.
NO MODEL.
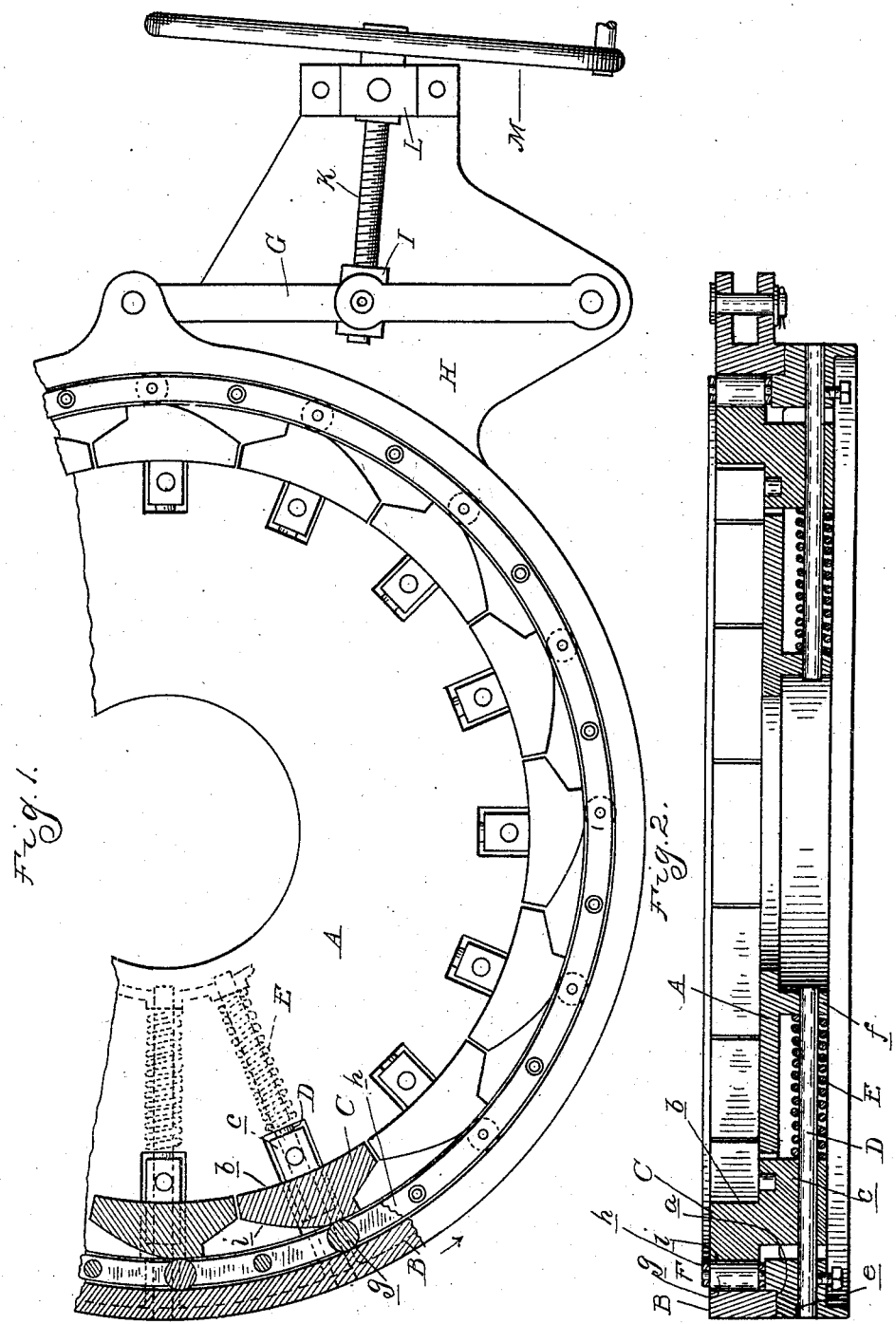
Witnesses
Jas. P. Barry
Geo. W. Graefer
Inventor
Emil Cederstrom
By James Whittemore
Atty No. 772,403.　　　　　　　　　　　　　　　　　　　Patented October 18, 1904.

UNITED STATES PATENT OFFICE.

EMIL CEDERSTROM, OF DETROIT, MICHIGAN, ASSIGNOR OF THREE-FOURTHS TO DAVID O. PAIGE AND THOMAS S. CHRISTIE, TRUSTEE, OF DETROIT, MICHIGAN.

TIRE-SETTER.

SPECIFICATION forming part of Letters Patent No. 772,403, dated October 18, 1904.

Application filed August 11, 1903. Serial No. 169,083. (No model.)

*To all whom it may concern:*

Be it known that I, EMIL CEDERSTROM, a citizen of the United States, residing at Detroit, in the county of Wayne and State of Michigan, have invented certain new and useful Improvements in Tire-Setters, of which the following is a specification, reference being had therein to the accompanying drawings.

The invention relates to machines for setting tires of vehicle-wheels by the compression or upsetting of the cold metal.

It is the object of the invention to obtain a simple and compact construction and one with which the work may be readily performed with a minimum loss through frictional resistance.

The invention consists in the construction as hereinafter set forth.

In the drawings, Figure 1 is a sectional plan view of the apparatus, and Fig. 2 is a vertical central section thereof.

A is a bed-plate, preferably formed by cast metal and of a size somewhat greater in diameter than the maximum size of tire to be set.

B is an annular band supported upon the bed A adjacent to the periphery thereof and preferably engaging with an annular rabbet $a$ therein. This band is preferably formed of steel and is of sufficient strength to carry the total strain caused by the upsetting operation.

C represents jaws having segmental faces $b$ for bearing upon the tire and being radially adjustably secured to the bed. As shown, the securing means comprises a downwardly-projecting lug $c$ from the jaw C, which is apertured to slidingly engage with a radially-extending rod D, secured to the bed beneath the same. The outer ends of these rods are secured in the downwardly-extending flange $e$ on the bed, which forms also a support for the latter, and the inner ends of the rods are secured in the downwardly-extending flange $f$. Between the flange $f$ and the lug $c$ are arranged springs E, sleeved upon the rods D.

F is a roller-bearing arranged between the ring B and the jaws C and comprising a series of vertically-arranged rolls $g$, which are held suitably spaced by the ring $h$. The outer faces of the jaws C are provided with inclines $i$, with which the rollers $g$ are adapted to contact. The rolls also are adapted to contact with the inner faces of the ring or annulus B. Thus any radial movement imparted to the ring B in the direction indicated by the arrow will cause the intermediate rollers to travel over the incline $i$, thereby imparting an inward radial movement to the jaws C.

With the construction described in operation the wheel having the tire to be set arranged thereon is placed upon the bed A within the jaws C, which in their initial position are at the outward limit of movement. The operator then rotates the ring or annulus B, so as to cause the wedging of the rollers $g$ and the consequent inward movement of the jaws. This will cause the said jaws to bear against the tire and compress the same around the filling of the wheel.

The rotation of the ring B may be accomplished by any suitable mechanism; but in the construction shown a toggle-lever G is used, one end of which is connected with the ring and the other end to an extension H of the bed. I is a nut secured to the joint of the toggles, and K is a screw-threaded rod engaging said nut and swiveled at L in a bearing upon the extension H of the bed. M is a hand-wheel for rotating the screw K.

In place of the mechanism just described any suitable mechanism may be employed, and where great power is required it may be preferable to provide a hydraulic motor for moving the ring.

What I claim as my invention is—

1. A tire-setter comprising a bed, a series of radially-movable jaws, a series of radially-extending guides on said bed passing through said jaws for slidably securing the same thereto, an annulus surrounding said jaws, means for rotatively mounting said annulus, roller-actuated wedges between said jaws and annulus adapted to transform the rotary movement of the latter into the radial movement of the former, and resilient means for normally retaining the jaws in their initial position.

2. A tire-setter comprising a bed and series of jaws for embracing the tire, radially-extending guides on said bed passing through said jaws for slidingly securing the same thereto, an annulus surrounding said jaws, means for rotatively moving said annulus, and roller-actuated wedges between said jaws and annulus adapted to transform the rotary movement of the latter into the radial movement of the former.

3. A tire-setter comprising a bed having a rabbeted portion at its outer edge, an annulus rotatively mounted upon said rabbeted portion, a series of radially-movable jaws secured to said bed within said annulus, the outer faces of said jaws being inclined to the inner face of the annulus, rollers secured to the bed intermediate said annulus and jaws and means for rotating said annulus to cause wedging of said rollers, and the consequent inward movement of said jaws.

4. A tire-setter comprising a bed, an annulus rotatively mounted thereon, laterally-extending guides thereupon, a series of jaws within said annulus radially movably secured to said bed by said guides, and having their outer faces inclined to the inner face of the annulus, a series of rollers secured to the bed between said annulus and the respective jaws, and a ring connecting and spacing said rollers and means for rotating said annulus to cause the simultaneous wedging of said rollers and inward movement of the jaws.

5. A tire-setter comprising a bed and depending flanges thereon, and radially-extending guides secured to said flanges, jaws sleeved upon said guides and projecting upward through radial slots in said bed; an annulus rotatively mounted upon said bed, and surrounding said jaws, a series of rollers interposed between said annulus and the respective jaws, the outer faces of the latter being inclined to the inner face of the annulus, a ring connecting and spacing said rollers, and means for rotating said annulus to cause the simultaneous wedging of said rollers and inward movement of said jaws.

In testimony whereof I affix my signature in presence of two witnesses.

EMIL CEDERSTROM.

Witnesses:
H. C. SMITH,
JAS. P. BARRY.